United States Patent Office 3,360,514
Patented Dec. 26, 1967

3,360,514
PROCESS FOR PREPARING EPSILON-CAPROLACTAMS
Francis Weiss, Pierre-Benite, and Arsene Isard, Saint-Genis-Laval, France, assignors to Ugine Kuhlmann, Paris, France, a corporation of France
No Drawing. Filed Aug. 17, 1965, Ser. No. 480,484
Claims priority, application France, August 28, 1964, 986,565
6 Claims. (Cl. 260—239.3)

ABSTRACT OF THE DISCLOSURE

The process for the preparation of epsilon-caprolactams from the reaction of polyesters of an epsilon-hydroxycaproic acid with aqueous ammonia or a primary amine under autogenous pressure at a temperature of about 250° C. to 475 C.

---

This invention relates to a process for preparation of epsilon-caprolactams. In preparation of these lactams numerous processes are utilized, in particular, those which use various derivatives of epsilon-hydroxycaproic acids, such as epsilon-caprolactones, 6-hydroxycaproamides, 6-acetoxycaproic acid, etc. These various processes have a drawback of requiring relatively expensive raw materials.

We have noticed that epsilon-caprolactams may be obtained from polyesters of epsilon-hydroxycaproic acids. In particular, it is possible to use polyesters obtained as by-products during the preparation of epsilon-caprolactones or hydroxycaproic esters, such polyesters acquiring a very interesting valorization.

This invention comprises subjecting to the action of aqueous solutions of ammonia or a primary aliphatic amine, under pressure and at a temperature between about 250 and 475° C., polyesters of an epsilon-hydroxycaproic acid having the following formula:

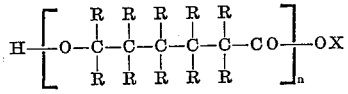

or:

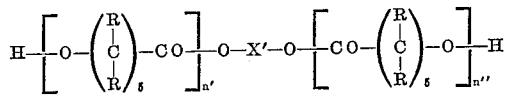

in which:

R is an atom of hydrogen or a lower alkyl radical, or a cycloalkyl radical, e.g. cyclohexyl;
X is an atom of hydrogen, a lower alkyl radical or a hydroxyalkyl radical;
X' is an alkylene radical containing 2 to 6 atoms of carbon;
$n$ and the sum of $(n'+n'')$ are a number from about 4 to about 40;

then, in extracting the resulting caprolactam by a solvent therefor.

Ammonia or a primary aliphatic amine containing 1 to 6 atoms of carbon, e.g. methylamine, ethylamine, n-propylamine, isopropylamine, n-butylamine, sec-butylamine, tert-butylamine, etc . . . are employed; ammonia gives caprolactam, whereas the amines give corresponding N-alkylated caprolactams. Preferably about 1 to 10 mols of ammonia or amine per epsilon-hydroxycaproyl recurring unit of the polyester are used and the process is carried out in the presence of water. The quantity of this solvent being such that the polyester concentration in the total mixture is between about 5 and 40% by weight.

The reaction is executed under autogenous pressure of the mixture. It tends towards an equilibrium state in which the rate of transformation into a monomer caprolactam is about 30% to 55%. According to the temperature used, a few minutes or a few hours are required for reaching equilibrium; however, it is possible to limit the transformation rate to lower amounts.

For example, heating may be carried out during a time varying from 10 minutes to 2 hours, at a temperature between 320 and 400° C., which is the preferred temperature range of the process. At lower temperatures, the heating time must be longer, i.e., for 10 hours and even up to about 20 hours.

After cooling the mixture, the caprolactam is extracted by a solvent therefor. The solvents used for the extraction may be selected from halogenated hydrocarbons such as chloroform and aliphatic, alicyclic and aromatic hydrocarbons such as hexane, heptane, cyclohexane, benzene, toluene, xylene, etc.

The resultant aqueous solution, free from the caprolactam, may be recycled to the reactor, after which an addition of a fresh quantity of polyesters and ammonia or amine is made for recycling operation. Due to the recycling, a high efficiency of carprolactam is obtained compared to consumption of the polyester.

As initial polyesters, it is possible to employ by-products resulting from preparation of carprolactones. However, the polyesters may also be directly prepared by heating in the presence of an esterification catalyst either formyloxycaproic or acetoxycaproic acids or mixtures containing them (e.g. raw reaction mixtures resulting from their preparation). Thus, formic acid or acetic acid are directly recovered thereby presenting an appreciable advantage.

The following non-limitative examples illustrate our process. In these examples the quantities are indicated as parts by weight.

Example 1

58.5 parts of an epsilon-hydroxycaproic acid polyester having the formula H $\mathrm{[O-(CH_2)_5-CO]_xOH}$, with an ester equivalent of 117 and a molecular weight of 700 and wherein $x$ equals about 6, were employed. This quantity was introduced into a stainless steel high-pressure reactor with 180 parts of water and 34 parts of ammonia, and heated at 375° C. for 30 minutes. 21 parts of caprolactam were then extracted by chloroform which is 37% of theoretical. After extraction, the aqueous solution contained 5.6 parts of caprolactam and non-transformed products. 34 parts of ammonia and 21 parts of polyester were next added to the solution which was heated under the same conditions as above. An extraction by chloroform obtained 24 parts of caprolactam (i.e. a 47.8% output, compared to the total products present in the solution).

Example 2

A polyester having the same formula as in Example 1, but with a molecular weight of about 2,000 and an ester equivalent of 115 and wherein $x$ equaled 17 to 18 was employed. This polyester was in the form of a wax melting at 49–52° C. 57.5 parts of this polyester, together with 51 parts of ammonia and 180 parts of water, were heated at 375° C. for one hour. The extraction was then carried out by chloroform and, after the latter was evaporated, 27.4 parts of caprolactam was obtained, i.e., 48.4% of theoretical.

Example 3

This example was carried out continuously in a reactor formed by a stainless steel tube of 5 mm. inner diameter plunged into a bath of molten tin maintained at 390° C. The immersed portion had a volume of 60 cm.³. An aqueous mixture consisting of, by weight, 21.5% of a polyester identical with the polyester used in Example 2 and 12.5% of ammonia were fed under 230 kg./cm.² pressure. The mixture was maintained in a homogeneous state by stirring in an autoclave (high-pressure reactor), under an inert gas pressure of 230 kg./cm.². The flow was regulated at 90 cm.³/h. by a draw-off valve located at the reactor outlet. The reaction solution issuing from the reactor had an average concentration of 6.5% caprolactam by weight which corresponded to a transformation rate of 31%.

*Example 4*

82 parts of a polyester having the following formula:

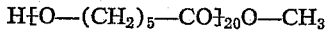

(a wax with a melting point of 54° C. and a molecular weight of 2,300) was heated with 34 parts of ammonia and 180 parts of water at 375° C. for one hour. After an extraction by chloroform, 40.5 parts of caprolactam was obtained, i.e., 51% of theoretical.

*Example 5*

82 parts of the same polyester, than used in the foregoing example were heated with 220 parts of methylamine and 880 parts of water at 375° C. for three hours. After an extraction by chloroform, 44.5 parts of N-methyl-caprolactam was obtained, i.e., 49% of the theoretical.

While we have described preferred embodiments of our invention it may be otherwise embodied within the scope of the appended claims.

We claim:

1. A process for preparation of epsilon-caprolactams comprising subjecting to the action of an aqueous solution of a member selected from the group consisting of ammonia and a primary aliphatic amine, a polyester of an epsilon-hydroxycaproic acid selected from the group consisting of

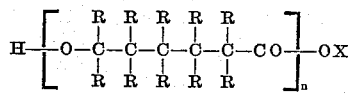

and

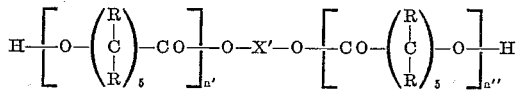

in which R is a member selected from the group consisting of hydrogen, a lower alkyl radical, and a cycloalkyl radical, X is a member selected from the group consisting of hydrogen, a lower alkyl radical and a hydroxyalkyl radical, X' is an alkylene radical containing 2-6 atoms of carbon, and $n$ and the sum of $(n'+n'')$ are a number from about 4 to about 40.

said subjecting being carried out under autogenous pressure and at a temperature of about 250° C.–475° C., the amount of said aqueous solution being such that the polyester concentration of the solution and itself is between about 5% and 40% by weight (and extracting the resulting epsilon-caprolactam by a solvent therefor.

2. The process of claim 1 wherein said extracting solvent is a halogenated hydrocarbon.

3. The process of claim 1 wherein said primary aliphatic amine has 1-6 atoms of carbon.

4. The process of claim 1 wherein said polyester is a by-product resulting from preparation of caprolactones.

5. The process of claim 1 wherein said polyester is the result of heating a member selected from the group consisting of formyloxycaproic acid and acetoxycaproic acid in the presence of an esterification catalyst.

6. The process of claim 1 wherein the amount of said member of said group consisting of ammonia and a primary aliphatic amine is about 1–10 mols per epsilon-hydroxycaproyl recurring unit of said polyester.

References Cited

UNITED STATES PATENTS 3,000,877  9/1961  Phillips et al. _____ 260—239.3
3,000,880  9/1961  Phillips et al. _____ 260—239.3

JOHN D. RANDOLPH, *Primary Examiner.*

WALTER A. MODANCE, *Examiner.*

R. BOND, *Assistant Examiner.*